Figure 1:
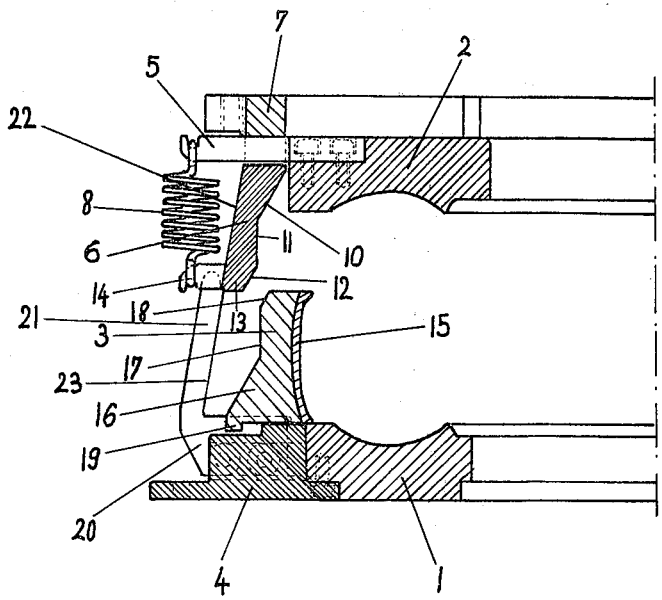

United States Patent [19]
Madaschefsky

[11] 3,897,181
[45] July 29, 1975

[54] VULCANISING MOULD FOR PNEUMATIC VEHICLE TYRES

[75] Inventor: Erich Madaschefsky, Vienna, Austria

[73] Assignee: Semperit Aktiengesellschaft, Vienna, Austria

[22] Filed: Jan. 14, 1974

[21] Appl. No.: 433,143

[30] Foreign Application Priority Data
Jan. 11, 1973 Germany............................ 2301310

[52] U.S. Cl. .............. 425/47; 425/46; 425/DIG. 5; 425/39; 425/40
[51] Int. Cl.² ...................... B29H 5/02; B29H 5/08
[58] Field of Search........................ 425/46, 47, 36

[56] References Cited
UNITED STATES PATENTS

| | | | |
|---|---|---|---|
| 3,553,789 | 1/1971 | Allitt | 425/36 |
| 3,730,658 | 5/1973 | Marra | 425/47 |
| 3,787,155 | 1/1974 | Zangl | 425/47 |
| 3,806,288 | 4/1974 | Materick | 425/47 |

FOREIGN PATENTS OR APPLICATIONS

| | | | |
|---|---|---|---|
| 1,590,815 | 4/1970 | France | 425/46 |
| 1,961,654 | 6/1971 | Germany | 425/46 |

*Primary Examiner*—J. Howard Flint, Jr.
*Attorney, Agent, or Firm*—Werner W. Kleeman

[57] ABSTRACT

A vulcanising mould for pneumatic vehicle tyres comprising a first mould part which cooperates with a second mould part and a plurality of peripheral segments for forming the tread of the tyre. The peripheral segments are movable by a closing ring connected to the first mould part via inner conical surface of said closing ring, the closing ring being movable in a direction which causes the peripheral segments to move towards one another against the action of a plurality of tension springs. The peripheral segments are connected to the second mould part via sliding components which are movable radially so that when the vulcanising mould is being opened the peripheral segments are moved outwards in radial fashion and when the vulcanising mould is open, the peripheral segments remain on the second part of the mould. The tension springs are disposed on the outside of the vulcanising mould.

3 Claims, 3 Drawing Figures

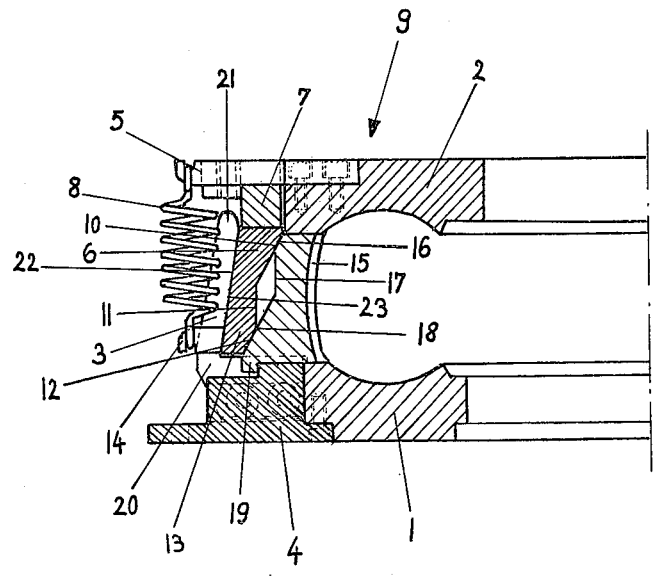

VULCANISING MOULD FOR PNEUMATIC VEHICLE TYRES

The invention relates to vulcanising moulds for pneumatic vehicle tyres.

German Patent Application No. DOS 18 05 178.0 describes a vulcanising mmould for pneumatic vehicle tyres in which the upper part of the mould, together with a ring plate, is held at a distance in the unloaded state by means of a number of compression springs within a path delimited by stop means. A closing ring which serves to move so-called peripheral segments is connected to the ring plate. When the mould is closed, the upper part of the mould, with the ring plate, is slowly lowered onto the unprocessed tyre. The upper part of the mould which, as a result of the relaxed compression springs, procedes the ring plate and the closing ring, thus passes into the end position enclosing the unprocessed tyre. Only in this position are the peripheral segments then moved inwards by the closing ring.

The compression spring enables the above described process to be carried out. This however results in the disadvantage that the compression springs mean that it is not possible for the outside of the upper part of the mould to be flat. Furthermore, the vulcanising mould described in the above application is necessarily rather high.

It is an aim of the invention to provide a vulcanising mould in which the above mentioned disadvantages are to a large extent avoided.

In the production of vehicle pneumatic tyres, an unprocessed tyre is introduced into a vulcanising mould, for the formation of the tread. This vulcanising mould is generally arranged in a heating press which has for example a plate heater.

It is a further aim of the invention to improve in comparison to prior art arrangements heat transfer between vulcanising mould and heating press, and thereby to obtain a reduction in the heating time and in addition a more uniform distribution of heat.

It is yet another aim of the invention to provide a vulcanising mould of relatively low height.

According to the present invention there is provided a vulcanising mould for pneumatic vehicle tyres comprising a first mould part which cooperates with a second mould part and a plurality of peripheral segments for forming the tread of the tyre, which peripheral segments are movable in radial fashion by a closing ring connected to the first mould part via inner conical surface of said closing ring, said closing ring being movable in a direction which causes said peripheral segments to move towards one another against the action of a plurality of tension springs, wherein the peripheral segments are connected to the second mould part via sliding components which are movable radially so that when the vulcanising mould is being opened the peripheral segments are moved outwards in radial fashion and when the vulcanising mould is open, the peripheral segments remmain on the second part of the mould, and wherein the tension springs are disposed on the outside of the vulcanising mould.

Preferably the first mould part forms, in use, an upper mould part and its outside surface which, in use, is uppermost is generally flat.

These tension springs enable the installed height of the mould to be kept relatively low and permit the vulcanisation of relatively wide tyres. In heater presses having plate heaters and using the above mould considerable improvements in heating time can be obtained since the generally flat exterior of the upper part of the mould improves the heat transfer over this surface.

Preferably each tension spring is suspended between two spring hooks one of which is fixed to the first part of the mould and passes through slots in the closing ring, and the other of which is fixed to the closing ring. In this arrangement faulty tension springs can be readily replaced and it is also easy to remove dirt and residues.

Figure 2:
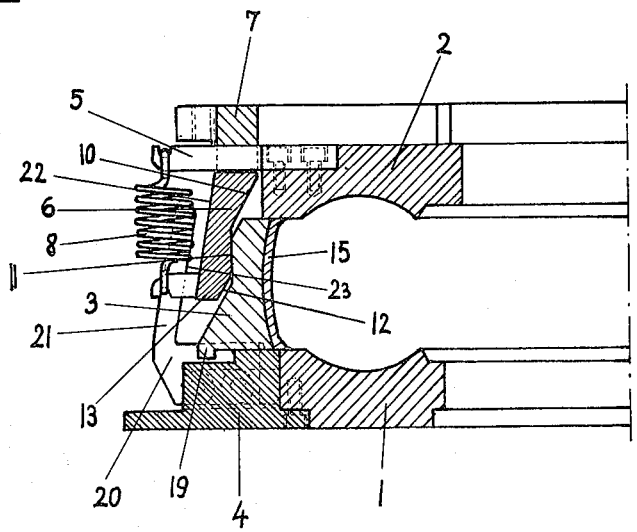

The present invention will now be described by way of example and with reference to the drawings, in which:

FIGS. 1, 2 and 3 are respective partial axial sectional views through a vulcanising mould designed in accordance with the invention, and illustrating three different operating positions.

A vehicle pneumatic tyre which is to be vulcanised, e.g. a steel cord tyre, is vulcanised in a vulcanising mould by means of an automatically operating heating press, and is in known manner pressed onto the inner walls of the mould by means of a membrane.

The vulcanising mould shown in the drawings comprises a mould lower part 1, a mould upper part 2 and peripheral segments 3. The lower part 1 is secured to a base ring 4 connected to the heating press. Above the upper part 2 which bears spring hooks 5 conducted outwards through slots in a closing ring 6, there is arranged a ring 7 which in the unloaded state, is held at a distance within a path delimited by stop means by a number of tension springs 8, but in the closed state of th vulcanising mould forms a level surface 9 with the latter. The ring 7 is joined to the closing ring 6 which has a wedge-shaped cross-section and which has inner surfaces 10, 11 and 12. In its lower part 13, the closing ring 6 bears spring hooks 14 which correspond to the spring hooks 5 on the upper part 2 of the mould. Between the spring hooks 5 on the upper part 2 of the mould and the spring hooks 14 on the closing ring 6 there are arranged the tension springs 8. The peripheral segments 3 which delimit the tread zone and are arranged between the mould components 1 and 2 possess, on their inside, replaceable facings 15 which possess the negative profile of the tread to be moulded. The outer surface of the peripheral segments 3 narrows towards the upper part 2 of the mould and possesses surfaces 16, 17 and 18 which correspond to the surfaces 10, 11 and 12 of the closing ring 6. The peripheral segments also have a stop means 19. Each of the peripheral segments 3 is connected to a sliding component 20 which may be radially moved on the base ring 4. The sliding components 20 are also provided with projections 21 which release the peripheral segments 3, if these happen to stick too much in the rubber of the tyre, by means of the outer cone of the closing ring 6. This outer cone on the closing ring 6 is formed by an outer conical surface 22 which converges in the same direction to the inner conical surfaces 10 and 12 and which cooperates with the concentric conical surfaces 23 of the projections 21.

During the vulcanisation of a tyre, when the upper part 2 of the mould is raised, the unprocessed tyre is introduced into the lower part 1 of the mould by the feed device. The peripheral segments 3 are thus in the outermost radial position (FIG. 1). During the course of the closure of the heating press, the upper part 2 of the mould, which part is connected to the heating press via the ring 7, is slowly lowered onto the unprocessed tyre. The tension springs 8 thus hold the closing ring 6 in combination with the ring 7 in its initial position, whilst the upper part 2 of the mould is simultaneously being closed. The upper part 2 of the mould which precedes the ring 7 and the closing ring 6, as a result of still relaxed tension springs 8, thus passes into the end position enclosing the unprocessed tyre, whilst the peripheral segments 3 remain in the outermost positon (FIG. 2). In this position the heating membrane is now subjected to pressure and brought into contact with the inner wall of the tyre. The spring force of the tension springs 8 is such that the preliminary pressure is no longer able to lift the upper part 2 of the mould. The unprocessed tyre is thus satisfactorily fixed in position. As a result of the continued closing movement the dropping closing ring 6 moves inwards the peripheral segments 3 by means of the surfaces 10, 11 and 12 in radial fashion at the same time moulding the tread profile until the mould is finally closed. The tension springs 8 on the outside of the mould are thus moved apart between the spring hooks 5 on the upper part 2 of the mould and the spring hooks 14 on the closing ring 6 and are thus tensioned because the upper part 2 of the mould was already at standstill. The mould is completely closed by the closing pressure (FIG. 3). At the end of the vulcanisation process, when the heating press is opened, firstly the closing ring 6 will be raised as a result of the tensioned tension springs 8. At the same time the peripheral segments 3 are pressed outwards in radial fashion. This is effected by the outer cone of the closing ring 6 which push the loosening or release projections 21 outwards which in turn move the peripheral segments 3.

This demoulding process is carried out whilst the tyre is still fixed laterally to prevent any deformation occurring. It is only subsequently when the closing ring 6, in combination with the ring 7, has once more reached its initial position, that the upper part 2 of the mould is raised. When the heating press is completely open, and the heating membrane is no longer subject to pressure, an ejector mechanism (not shown) is extended to contact the lower bead ring of the tyre and to raise the latter above the mould from where it is removed. Once this has been done, a fresh unprocessed tyre can be supplied to the mould.

I claim:

1. A vulcanising mould for pneumatic vehicle tyres, comprising a first mould part, a second mould part, a plurality of peripheral segments disposed between said first and second mould parts for forming the tread of the tyre, said first mold part being positionally oriented to cooperate with said second mould part and said plurality of peripheral segments, a closing ring operatively connected to said first mould part, said closing ring including inner conical surface means for radially moving said peripheral segments, a plurality of tension springs supported by said first mould part and said closing ring, said closing ring being movable against the action of said plurality of tension springs in a direction which causes said peripheral segments to move towards one another, sliding components which are radially movable for operatively connecting the peripheral segments to the second mould part, said sliding components including means for ensuring that when the vulcanising mould is being opened the peripheral segments are moved radially outwards and when the vulcanising mould is opened the peripheral segments remain on the second mould part, said tension springs being disposed at the outside of the vulcanising mould, said first mould part and said closing ring in the open condition of the vulcanising mould and during closing of the vulcanising mould contacting one another to thus provide for direct heat transfer to said first mould part.

2. A vulcanising mould as defined in claim 1, wherein each tension spring is suspended betweeen two spring hooks, one of said spring hooks being fixed to the first mould part and passing through slots provided in the closing ring, and the other spring hook being fixed to the closing ring.

3. A vulcanising mould as defined in claim 2, wherein the first mould part forms, during use thereof, an upper mould part and its outside surface which, when in use, is uppermost is substantially flat.

* * * * *